United States Patent [19]

Weldon et al.

[11] Patent Number: 4,859,819

[45] Date of Patent: Aug. 22, 1989

[54] STAGED OPENING SWITCH

[75] Inventors: William F. Weldon, Austin; Ben M. Rech, Round Rock; Raymond C. Zowarka, Jr., Austin, all of Tex.

[73] Assignee: Board of Regents, The University of Texas System, Austin, Tex.

[21] Appl. No.: 91,656

[22] Filed: Sep. 1, 1987

[51] Int. Cl.[4] .................... H01H 33/04; H01H 47/00; H02H 5/04

[52] U.S. Cl. ........................... 200/146 R; 200/144 R; 361/23; 307/149; 307/132 R; 307/115; 307/113

[58] Field of Search ....................... 200/146 R, 144 R; 361/23; 307/149, 113, 115, 132 R

[56] References Cited

PUBLICATIONS

High Speed Foil Breakers, by Andrezen, 1976.

A Method for Enhancing Exploding Aluminum Foil Fuses for Inductive Storage Switching, by Conte, Friedman and Ury, Nov. 1976.

Pulse Power Systems Employing Inductive Energy Storage, by Trost et al., Nov. 1976.

Explosively Actuated 100 kA Opening Switch for High Voltage Applications, by Ford and Vitkovitsky, Jul. 1977.

Two Stage Opening Switch Techniques for Generation of High Inductive Voltages, by Conte et al., Oct. 1977.

Inductive Charging of Pulse Lines in 0.1 to 1.0 MJ Range Using Foil Fuses Staged with Explosively Actuated Switches, by Conte et al., Mar. 1978.

*Primary Examiner*—Robert S. Macon

*Attorney, Agent, or Firm*—Arnold, White & Durkee

[57] ABSTRACT

A staged switch for conducting a large electrical current for an indefinite time period and then rapidly switching the current into a load circuit. The switch comprises a first stage which can conduct a large electrical current for an indefinite time period without damage to the stage and a second stage which is a fast-opening element. The first stage includes primary and secondary contacts wherein the primary contacts conduct a charging current and the secondary contacts divert the current into the fast-opening second stage. The secondary contacts "make" before the primary contacts "break", reducing the damage to the contacts which might otherwise be experienced. The second stage is a low-inductance element which reduces the level of energy absorbed by the first-stage contacts, minimizing damage to the contacts. The second-stage element may be constructed in a cartridge and may be loaded into the switch using an autoloader device.

7 Claims, 4 Drawing Sheets

Fig. 1
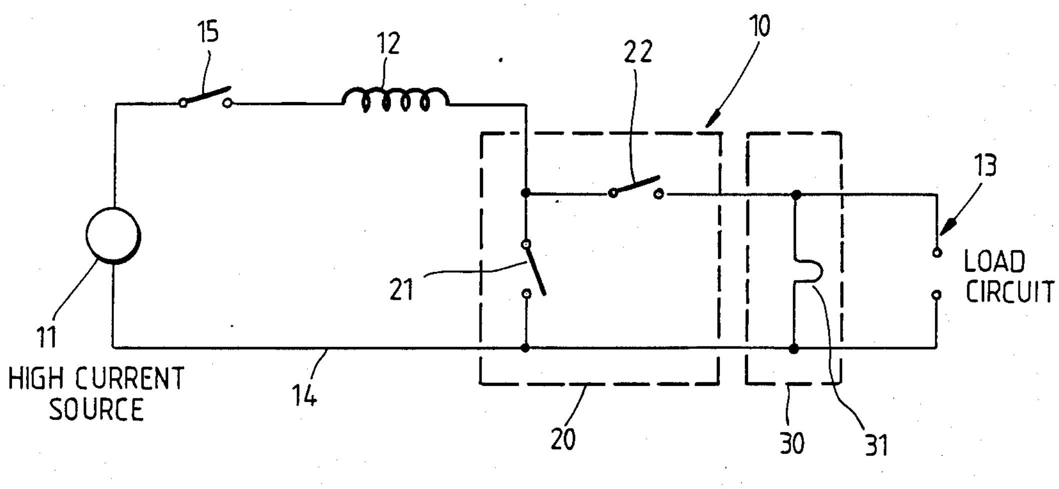
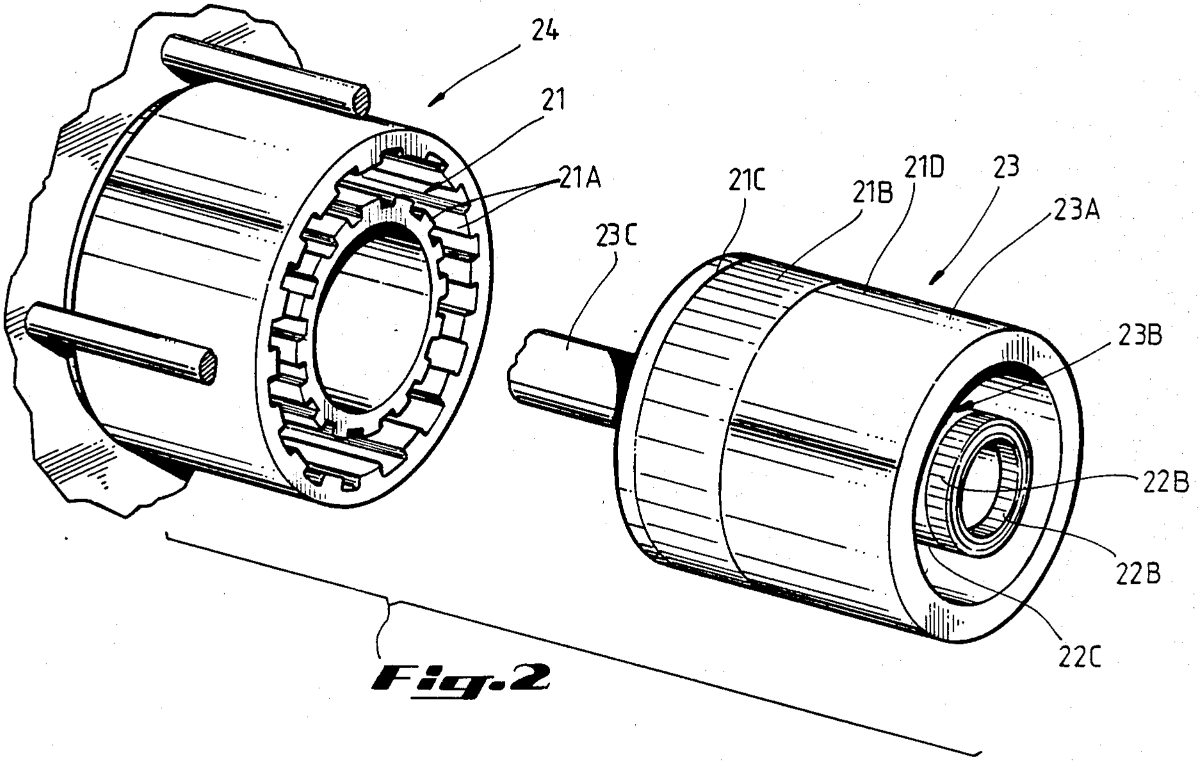
Fig. 2

STAGED OPENING SWITCH

FIELD OF THE INVENTION

The present invention relates to switches for switching high electrical current into electrical loads. More specifically, the present invention relates to staged switches which are capable of conducting large electrical currents for relatively long periods of time and which are capable of opening in a short time interval.

BACKGROUND OF THE INVENTION

The problems associated with switching large electrical currents are well known, and tremendous effort has been expended in attempting to overcome those problems. Among the major problems is the difficulty in switching large electrical currents to an electrical load in a sufficiently short time to achieve acceptable voltage and current rise times. Such requirements are common in supplying electrical energy to railguns, flashlamps, and other high power devices.

Present-day sources of extremely high electrical current (on the order of several megamps) and energy (on the order of tens of megajoules) cannot provide the rise times necessary to directly operate devices such as railguns, high power lasers, and other high energy-consuming devices. A switch must be provided that allows the high current source to first transfer energy to an inductive store, for example, and then transfer the current to the load circuit. The switch is required to meet two conflicting requirements. It must be capable of conducting large electrical currents for relatively long periods of time and then opening in a relatively short time interval.

One known device for transferring an electrical current to a load is an electrical circuit breaker. This device includes contacts which, when closed, short circuit the electrical load and conduct the electrical current. When the circuit breaker is operated, the contacts separate and the electrical current is diverted into the load. However, the operating time for even the fastest circuit breakers is on the order of several milliseconds, and the desired switching times are typically in the tens of microseconds.

A second device which has been used to interrupt large electrical currents and transfer them to an electrical load is an explosively activated switch. Such a device will typically include a current-carrying, aluminum tube having an explosive primer cord inside the tube and extending along its longitudinal axis. Prior to activation of the switch, the aluminum tube conducts the large electrical current and, if properly designed, will do so for the necessary length of time. Steel cutters surround the exterior of the tube. When the switch is to be activated, the primer cord is ignited and the resulting explosion drives the tube against the steel cutters and the tube is ruptured in many locations along its length. The electrical continuity between the ends of the aluminum tube is thus interrupted. Explosive devices have been reported as having opening times of approximately 50 microseconds. However, they are relatively complex and expensive devices which are good for one operation only.

Staged switches have been used wherein a current-carrying device is used in parallel with a fast opening device. The fast opening device, which may be a fuse for example, is connected in parallel with a mechanical circuit breaker or explosively activated switch and is normally designed to achieve desired compression of the electrical pulse. The operation of the circuit breaker or the activation of the explosive switch causes the electrical current to be diverted to the fast-opening fuse. For very large electrical currents, the faster operating explosive device is preferred to the relatively slow operating mechanical circuit breaker.

SUMMARY OF THE INVENTION

The present invention provides the large current-carrying capacity required in present-day applications as well as the fast-opening times and the ability to withstand the high voltages which build up in such opening devices. A staged switch includes a first stage which is mechanical in nature and is capable of handling many opening cycles at high current without significant damage to its contacts. A second stage is a modular fuse-type switch which must be replaced after each opening cycle. The combination of the two stages allows the switch to operate without destruction of the primary contacts.

The first stage of the switch includes primary and secondary contacts which are used to conduct the large electrical currents and then transfer those currents to the fast-acting fuse stage. During initial charging of the inductor storage device, the primary contacts of the first stage are closed, completing an electrical circuit between a high-current source and the inductor storage. The secondary contacts in the first stage are open during this initial charging. When the switch is activated, the secondary contacts close, inserting the fuse stage into the circuit for the first time. Shortly thereafter, the primary contacts open, transferring full current into the second stage. The fuse-type second stage is a very light, fast-acting device which "blows", transferring the full electrical current to the electrical load connected in parallel with the second stage. The primary contacts of the first stage remain open for a time interval sufficient to allow the inductive energy to transfer to the load circuit. The primary contacts then remake, providing a short circuit across the load.

The make-before-break feature allows the second stage fuse to be made of lightweight components that need not see full charging duty, requiring less explosive charge to open the stage. Further, the low-inductance second stage will control the damage to the first stage primary contacts, particularly on remake of those contacts after operation of the switch. Finally, the contact remake feature enhances the capability of the staged switch to be used repetitively in short succession.

BRIEF DESCRIPTION OF THE DRAWINGS

FIG. 1 shows a circuit diagram of a staged opening switch according to the present invention.

FIG. 2 is a perspective view showing a portion of a staged switch.

DETAILED DESCRIPTION OF A PREFERRED EMBODIMENT

Figure 2A:
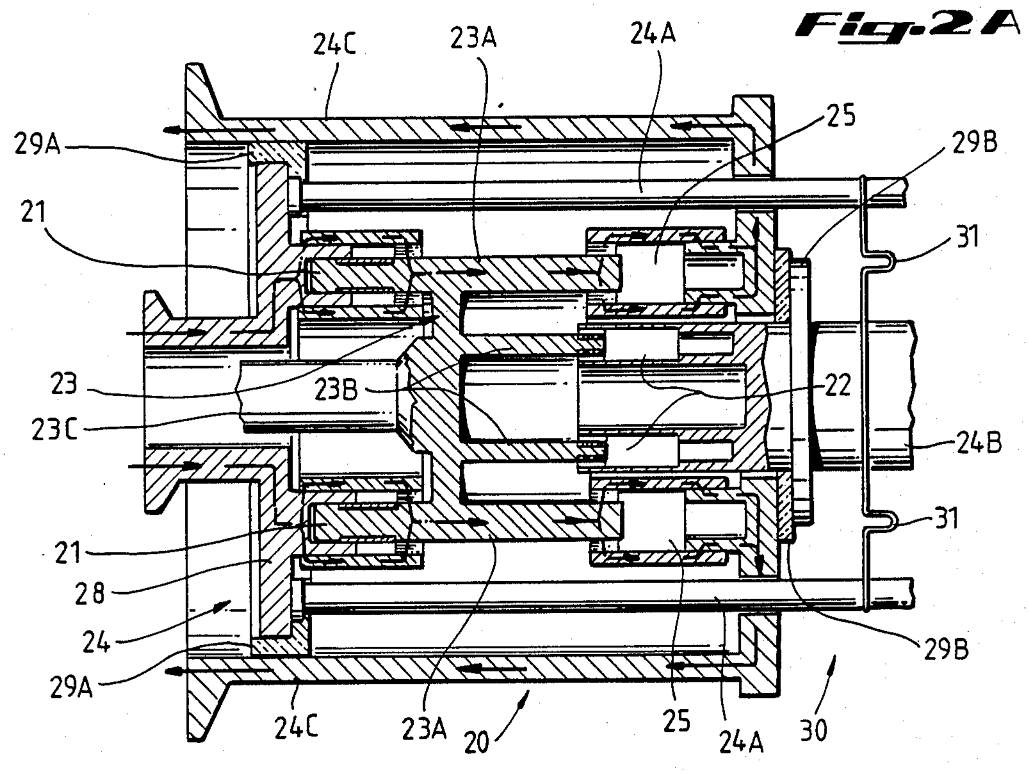
FIG. 2A is a sectional view of the staged switch in its charging position, showing the charging path of the electrical current through the first stage.

FIG. 1 is a circuit diagram of a system employing a staged switch 10 incorporating the principles of the present invention. A prime power source 11, such as a homopolar generator, is used to charge an inductor 12 where electric energy may be "accumulated" for later transfer to a load circuit 13.

The staged switch 10 includes a first stage 20 having primary contacts 21 and secondary contacts 22 and a second stage 30 having a fast-opening element 31. The primary and secondary contacts 21 and 22 are relatively large, low resistance contacts which are capable of conducting large electrical currents without damage. As will be discussed below, the secondary contacts 22 are "make-before-break" contacts which means that, when the first stage 20 is operated, the secondary contacts 22 close and begin to conduct electric current before the primary contacts 21 open and cease conducting. The element 31 of the second stage 30 is preferably a very light, fast-acting device such as a fuse element or an explosive switch.

The staged switch 10 is interposed between the power source 11 and inductor 12 and the load circuit 13. The primary contacts 21 are connected in electrical series with the power source 11 and the inductor 12 to complete an electrical charging circuit 14. A charging circuit switch 15 may also be included in the charging circuit 14. The secondary contacts 22 and the second stage element 31 are connected in electrical series and, together, are connected in electrical parallel with the primary contacts 21. The load circuit 13 is electrically connected parallel to the element 31 of the second stage 30.

The normal operation of the circuit of FIG. 1 is substantially as follows: the primary contacts 21 of the first stage 20 are closed and the secondary contacts 22 are opened. An electrical load is connected into the load circuit 13 in electrical parallel with the element 31 of the second stage 30. The charging circuit switch 15 is closed, completing the charging circuit 14, and the power source 11 begins to charge the inductor 12. At peak current, the secondary contacts 22 close, inserting the second stage 30 into the circuit for the first time. Shortly thereafter (typically milliseconds), the primary contacts 21 open, diverting full current into the element 31. The element 31 is then opened and full current is transferred to the load circuit 13. After a predetermined time interval, the primary contacts 21 reclose, creating a short circuit across the load.

The first stage 20 is mechanical in nature and may handle tens of operating cycles at high current before re-work is required. The second stage 30 is an explosive or fuse design and must be replaced after each opening cycle. The nature and construction of the first stage 20 and its combination with the second stage 30 allows the switch 10 to operate without destruction of the first stage contacts 21 and 22. Low inductance between the first and second stages 20 and 30 prevents extreme damage to the first stage contacts 21 and 22, allowing them to be used repeatedly.

Referring now to the sectional view in FIG. 2A, one embodiment of a staged switch 10 according to the present invention includes a first stage 20 and a second stage 30. The first stage 20 includes primary contacts 21, secondary contacts 22, and return contacts 25, and the second stage 30 includes fast-blow fuse elements 31.

As can be easily seen by reference to FIG. 2, the first stage 20 is of a coaxial construction wherein a cylindrical, conductive armature 23 is contained within a cylindrical, conductive stator 24 and is movable longitudinally relative thereto. Referring both to FIG. 2 and FIG. 2A, the armature 23 has a primary member 23A and a secondary member 23B, each member 23A and 23B comprising a tubular-like member, the member 23A surrounding and being concentric with the secondary member 23B. The interior and exterior surfaces of the members 23A and 23B provide conductive surfaces for engaging contacts 21, 22 and 25, as will be more clearly shown below. The armature 23 is movable longitudinally relative to the stator 24 by a pneumatic mechanism (not shown) acting through an actuator arm 23C.

Continuing to refer to FIG. 2A, the stator 24 includes a primary stator member 24A comprising a hollow cylinder which surrounds the armature 23. The stator 24 further includes a secondary stator member 24B which is a cylinder structure concentric with the hollow cylinder 24A and which is contained within the cylinder 24A. The member 24B is stationary with respect to the cylinder 24A. Stator member 24C is an electrically-conductive, cylindrical structure generally surrounding the primary and secondary stator members 24A and 24B and providing a return path for electrical current, as will be shown more clearly below. Member 24C is stationary with respect to members 24A and 24B and is electrically insulated from member 24A by means of insulators 29A and from member 24B by means of insulators 29B. Thus, stator members 24A, 24B and 24C and insulators 29A and 29B, together, form a relatively rigid stator 24. An annular stator end plate 28 is located at one end of the stator 24 and is connected to the primary stator member 24A.

Primary contacts 21 are mounted on the stator end plate 28 at a first end of the switch 10. The stator end plate 28 is generally annular in shape and a plurality of contacts 21 may be positioned about the surface of the plate 28 so as to receive the end of the cylindrical armature member 23A as shown below.

Figure 2B:
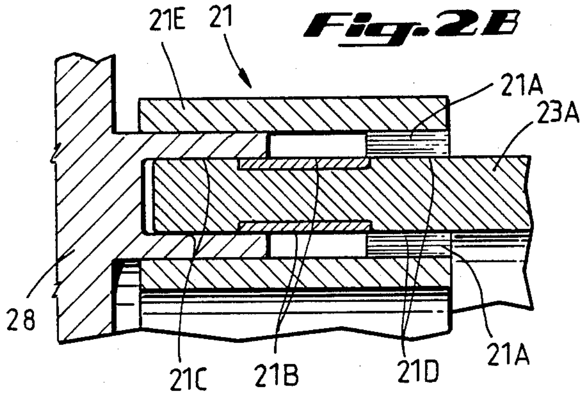
FIG. 2B is an enlarged sectional view of a primary contact of the switch of FIG. 2A.

As can most easily be seen by reference to the enlarged view of FIG. 2B, electrically-conductive fingers 21E protrude inwardly from the stator end plate 28 and support primary contact elements 21A. The contact elements 21A, in a preferred embodiment, are equipped with tungsten tips to better withstand damage due to arcing. The fingers 21E and primary contact elements 21A are situated so as to slidably receive a first end of the primary armature member 23A. The fingers 21E are "spring loaded"; that is, they are biased toward one another so that the contact elements 21A are urged into contact with the interior and exterior surfaces of the primary armature member 23A.

Continuing to refer to FIG. 2B, included on the interior and exterior surfaces of the armature member 23A are ceramic insulators 21B. The insulators 21B are positioned so as to create separate conductive surfaces 21C and 21D on the armature member 23A. When the insulators 21B are situated adjacent the contact elements 21A, no electrical current will flow between the elements 21A and the armature member 23A.

As shown in FIG. 2A, secondary contacts 22 are mounted on secondary stator member 24B. As in the case of the primary contacts 21, a plurality of secondary contacts 22 may be positioned in a generally circular configuration about the secondary stator member 24B to receive an end of the cylindrical armature member 23B as shown below.

Figure 2C:
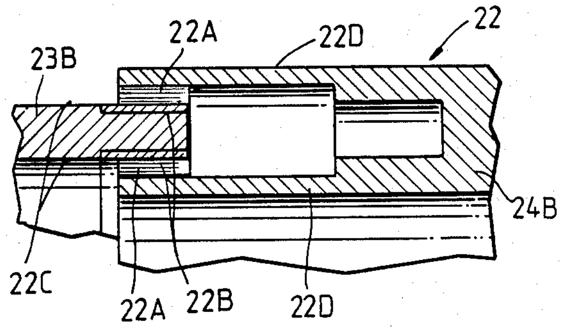
FIG. 2C is an enlarged sectional view of a secondary contact of the switch of FIG. 2A.

Referring to the enlarged view of FIG. 2C, each switch 22 includes electrically-conductive fingers 22D which protrude inwardly from the stator member 24B. The fingers 22D support secondary contact elements 22A which, in a preferred embodiment, are equipped with tungsten tips. The fingers 22D and secondary contact elements 22A are situated so as to slidably receive an end of the secondary armature member 23B. The fingers 22D are biased toward one another so as to urge the secondary contact elements 22A into contact with the interior and exterior surfaces of the armature member 23B.

Continuing to refer to FIG. 2C, included on the interior and exterior surfaces of the armature member 23B are ceramic insulators 22B. When the insulators 22B are positioned adjacent the secondary contact elements 22A, no electrical current will flow between the elements 22A and the armature member 23B. Conversely, when conductive surfaces 22C are positioned adjacent the elements 22A, electrical current will flow between the two.

Returning to FIG. 2A, return contacts 25 are mounted on stator member 24C and are constructed similarly to primary contacts 21. Also, as in the case of the primary contacts 21 and the secondary contacts 22, a plurality of return contacts 25 may be arranged in a generally circular configuration to engage the end of the generally cylindrical primary armature member 23A as shown below.

Figure 2D:
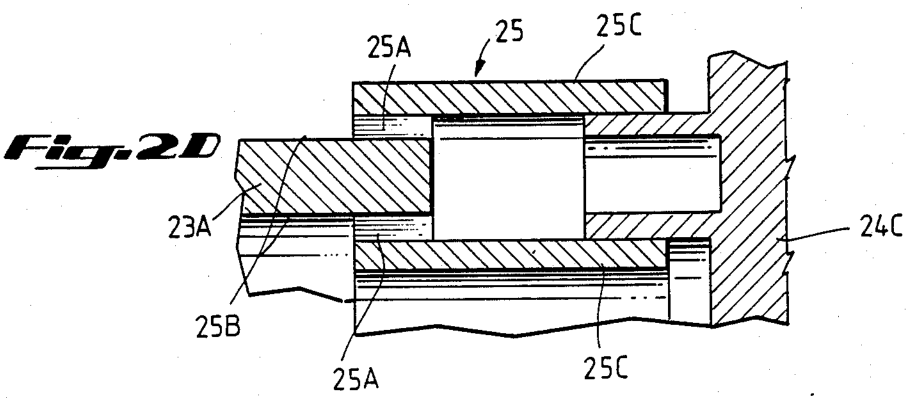
FIG. 2D is an enlarged sectional view of a return contact of the switch of FIG. 2A.

Referring to the enlarged view of FIG. 2D, each return contact 25 includes electrically-conductive fingers 25C which protrude inwardly from the stator member 24C. The fingers 25C support return contact elements 25A which, like the elements 21A and 22A, are equipped with tungsten tips. The fingers 25C and return contact elements 25A are situated so as to slidably receive a second end of the primary armature member 23A. The fingers 25C of the return contacts 25 are biased toward one another to urge the return contact elements 25A into contact with the interior and exterior surfaces of the armature member 23A. Conductive surfaces 25B on the primary armature member 23A are positioned adjacent the elements 25A and electrical current will pass therebetween.

Referring again to FIG. 2A, fuse elements 31 of the second stage 30 are connected between the primary stator member 24A and the secondary stator member 24B of the stator 24. As will be seen below, the elements 31 are connected in electrical series with the secondary contacts 22 and will conduct electrical current when the secondary contacts 22 are closed. The elements 31 may be of a foil fuse design or may be of any other suitable material or may be of an explosively-actuated type.

FIG. 2A shows the staged switch 10 in its charging position. The primary contacts 21 of the first stage 20 are in contact with conductive areas 21D of the armature member 23A and provide a conductive path between the stator end plate 28 and the primary armature member 23A for charging current generated by a power source 11 to charge an inductor 12, as in FIG. 1. The secondary contact elements 22A are adjacent the ceramic insulators 22B on the armature member 23B and prevent current flow between the secondary stator member 24B and the secondary armature member 23B. Therefore, no current will flow through the elements 31 of the second stage 30. In this position, the charging current follows its primary electrical path, flowing through the primary contacts 21 to the conductive armature member 23A, through that member 23A to the return contacts 25 at the opposite end of the member 23A, and through those return contacts 25 to the stator member 24C to exit the switch 10. The arrows in FIG. 2 show the path of the electrical charging current through the switch 10.

Figure 3:
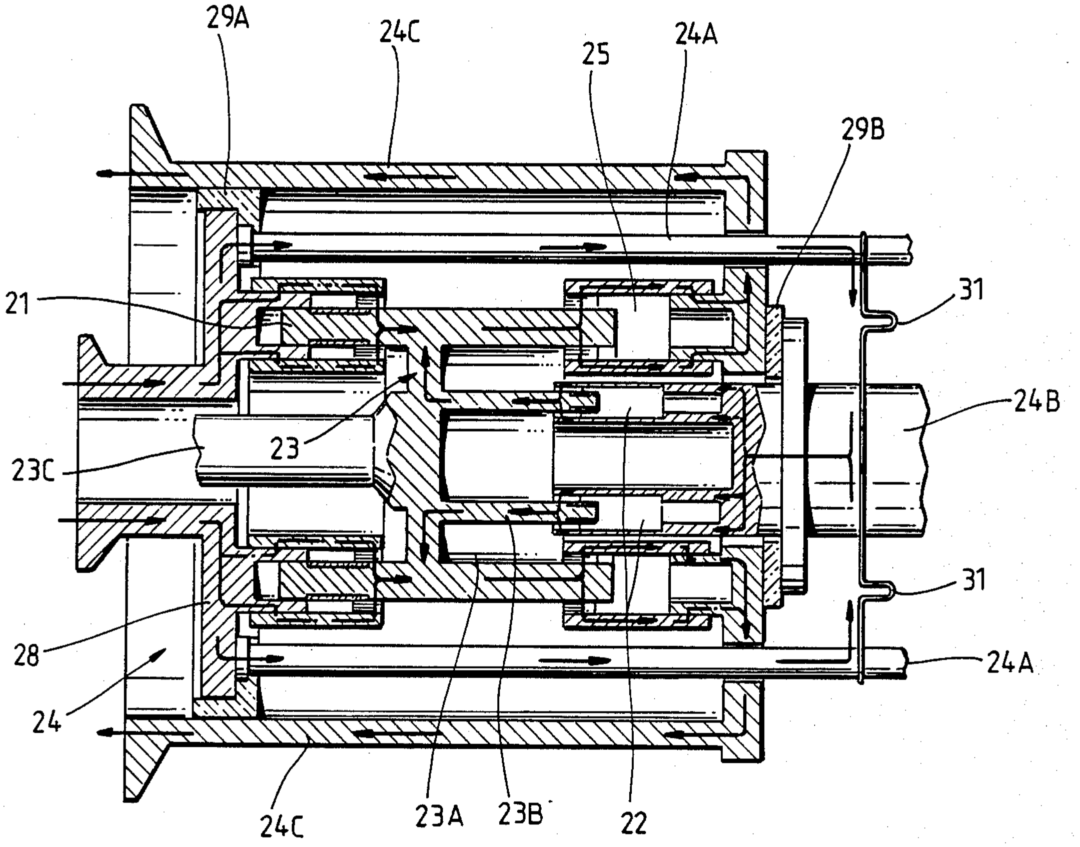
FIG. 3 is a sectional view of the staged switch in its intermediate position, showing the current path through the first and second stages simultaneously.

Referring now to FIG. 3, the first stage 20 has been actuated by the movement of the armature 23 from its charging position to an intermediate position wherein the primary contacts 21 are continuing to conduct while the secondary contacts 22 have closed and have begun to conduct.

As the armature 23 is advanced from its charging position, shown in FIG. 2A, the secondary contacts 22 begin to conduct electric current. The ceramic insulators 22B, which were previously adjacent the contact elements 22A, begin to be longitudinally displaced relative to the elements 22A and the conductive surfaces 22C of the secondary armature member 23B make electrical contact with the elements 22A. The return contacts 25 continue to conduct because of the unbroken continuity between the primary armature member 23A and the return contact elements 25A. Consequently, a continuous secondary electrical path for the flow of current is established through the primary stator member 24A, the fuse elements 31 of the second stage 30, the secondary stator member 24B, the secondary contacts 22, the secondary and primary armature members 23B and 23A, the return contacts 25, and the stator member 24C. Arrows in FIG. 3 illustrate this secondary electrical path.

As the armature 23 moves into its intermediate position shown in FIG. 3, the primary contacts 21 move toward a position wherein electric current will eventually be blocked. Although the conductive surface 21D of the primary armature member 23A remain in electrical contact with the primary contact elements 21A, the ceramic insulators 21B begin to move into contact with the elements 21A. As shown by arrows in FIG. 3, a continuous electrical path exists through the stator end plate 28, the primary contacts 21, the primary armature member 23A, the return contacts 25, and the stator member 24C. Thus, the primary electrical path established when the switch 10 is in its charging position, shown in FIG. 2A, remains intact when the first stage 20 moves into its intermediate position, shown in FIG. 3.

As is shown in FIG. 3 then, the electric current follows the two parallel paths through the switch 10. The load circuit 13 which will eventually receive the current is connected between the primary stator member 24A and the secondary stator member 24B of the stator 24, in electrical parallel with the elements 31 of the second stage 30.

Figure 4:
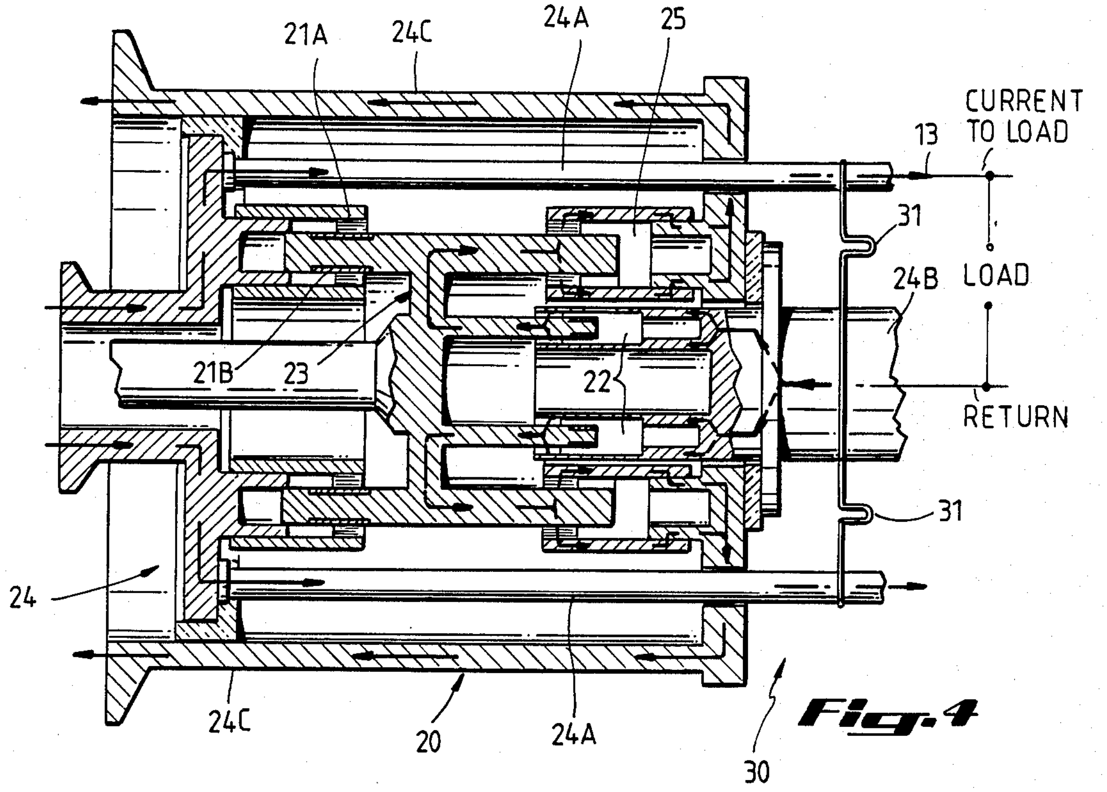
FIG. 4 is a sectional view of the staged switch in its discharge position, showing the flow of electrical current through the second stage after opening of the primary contacts.

The switch 10 maintains the condition shown in FIG. 3 for only a short time interval (typically , a few milliseconds), as the movement of the armature 23 from the charging position of FIG. 2A to the load position of FIG. 4 is continuous. Referring to FIG. 4, the continued longitudinal movement of the armature 23 relative to the stator 24 results in the ceramic insulators 21B of the primary contacts 21 being disposed between the primary contact elements 21A such that electric current will not flow through the primary contacts 21 and the primary electrical path is interrupted. The secondary electrical path is then exposed to the full current. Because the elements 31 of the second stage 30 are unable to support the full current, they burn open, thus breaking the secondary path. The only remaining path for the electric current is through the load circuit 13. The current flows through the primary stator member 24A, through the load circuit 13, back to the secondary stator member 14B, through the secondary contacts 22 to the armature 23, and, finally, through the return contacts 25 to the stator member 24C.

Figure 5:
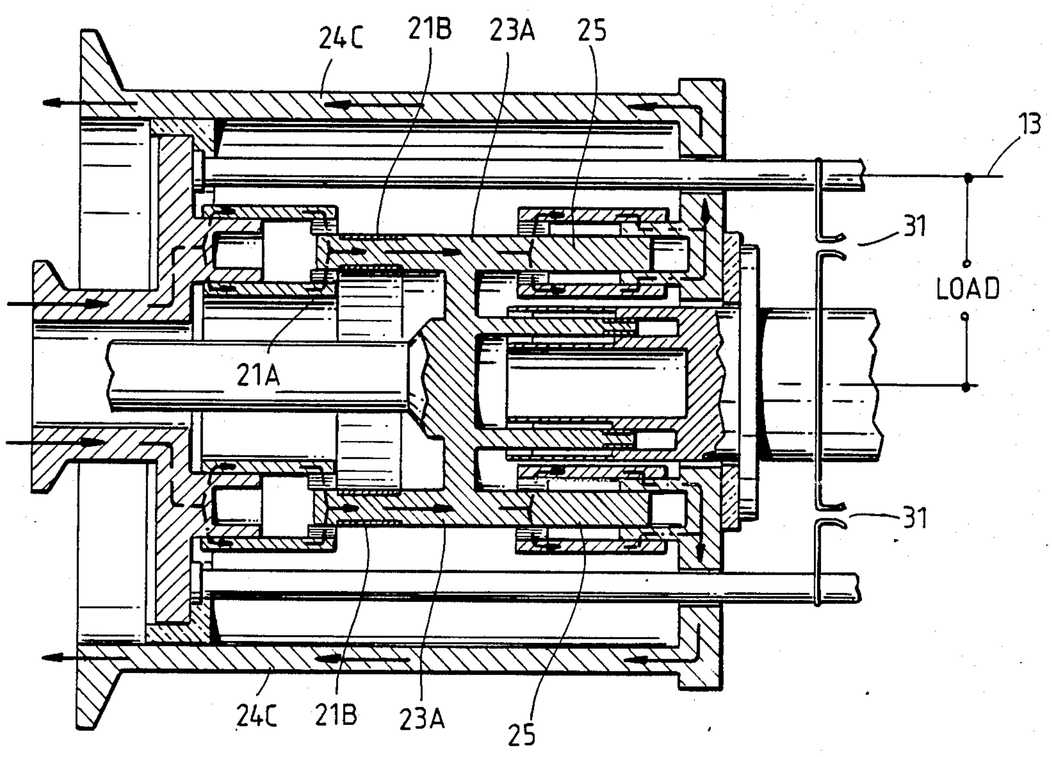
FIG. 5 is a sectional view of the staged switch in its remake position, after the second stage is opened and the primary contacts have been remade.

As the armature 23 continues to be moved longitudinally, the primary contacts 21 remake, clamping an electrical short circuit across the load circuit 13. FIG. 5 shows the armature 23 in its final remake position. The ceramic insulators 21B have been displaced from between the primary contact elements 21A and the conductive surfaces 21C are disposed therebetween. The charging current path is therefore restored and the current flows through the primary contacts 21 onto the primary armature member 23A, along the member 23A to the return contacts 25, and back onto the stator member 24C.

In a circuit where a homopolar generator charges the inductor at less than peak efficiency, the primary switch remakes to remove any remaining electrical energy from the generator. In some applications, the reclosing of the primary contacts 21 can result in burning and melting of the leading edges of the contact surfaces. This damage is caused by the energy which is absorbed by the contacts as they attempt to short-circuit the load circuit 13 and the damage can cause excessive heating in the switch.

To minimize the damage to the primary contacts 21, the fuse elements 31 may be constructed in a cartridge-type housing and may be loaded into the second stage 30 by means of an autoloader device. Such autoloaders for use with cartridge elements are known in the art. Immediately after opening of the elements 31 when the switch 10 is in its load position (FIG. 4) and before the first stage 20 assumes its remake position (FIG. 5), the autoloader can eject the spent element 31 and load a new element 31. The cartridge casing can provide a low-inductance electrical path which will result in a much-reduced level of energy absorbed by the primary contacts 21 when they reclose. The use of the autoloader and the reduction in heat generated at the contacts 21 provide the capability of repetitive operation of the switch 10 in short time intervals.

The coaxial geometry of the first stage 20 has many advantages. First, the coaxial configuration helps minimize leakage flux resulting from the large charging currents and minimizes the magnetic flux seen outside the switch 10. The magnetic forces of the coaxial geometry also help bias the contacts 21 and 22 on the stator 24 toward the tubular armature members 23A and 23B as the electric current increases through the switch 10. The hollow cylinders of the armature allow twice as many contacts per switch than would normally be obtained because of the use of both the interior and exterior surfaces.

Because the primary contacts 21 absorb an amount of energy when the current is transferred into the inductance and resistance of the fuse or explosive element 31, the inductance and resistance of the element 31 is kept at a minimum to reduce the absorbed energy. The exploding gaps in the element 31 are positioned such that the arc in the element 31 expands under magnetic forces, aiding the development of voltage across the second stage 30. Further, the low-inductance fuse elements 31, particularly when used with an autoloader, help minimize the energy absorbed by the contacts 21 when they reclose.

The first stage 20 may be actuated using a pneumatic drive unit. The switch 10 can be actuated repeatedly with the pneumatic drive and an autoloading fuse cartridge or explosive switch cartridge used with an autoloading mechanism. Although the embodiment shown and specifically described is a switch which operates in one direction only, minor alterations could be made to provide two-way operation. For example, a second set of ceramic insulators could be added to the secondary armature member 23B, similar to the insulators 22B and spaced longitudinally therefrom, such that, in the remake position shown in FIG. 5, the added insulators would be adjacent the secondary contact elements 22A. The remake position would then be electrically identical to the charging position for the first stage 20 and the switch 10 could be repeatedly operated without a need to reposition the armature 23 in its charging position after each operation.

Alternatively, a "rebound" mechanism may be provided so that when the armature 23 is operated and passes through its intermediate and load positions, it rebounds to its charging position automatically. This arrangement will also facilitate the repetitive operation of the switch 10.

Although one specific embodiment of the present invention has been shown and described, it will be understood by those of skill in the art that certain changes and modifications may be made in the embodiment without departing from the scope of the invention. One example of such a modification would be the use of multiple "socket-type" contacts in place of opposing contact surfaces to form the primary contacts 21, the secondary contacts 22 or the return contacts 25. The socket contacts would be circularly spaced about the stator end plate, for example, and the interior of each socket would include the conductive contact elements, e.g., 21A. The stator elements would be formed by a plurality of longitudinal fingers, each finger aligned with a single socket contact for sliding engagement therewith. The stator would then resemble a "barrel" comprising individual "slats". Such an embodiment may have application where a plurality of loads are to be separately but simultaneously switched.

The present invention should be limited only by the scope of the appended claims.

What is claimed is:

1. A two-stage switch arrangement, comprising:

a first-stage switch having a normally-closed primary contact and a normally-open secondary contact; and a second-stage switch, wherein the second-stage switch is connected in electrical series with the secondary contact of the first-stage switch, and the second-stage switch and secondary contact are connected in electrical parallel with the primary contact of the first-stage switch, and wherein, upon operation of the first-stage switch, the secondary contacts close before the primary contacts open and the primary contacts reclose before the secondary contacts re-open.

2. The switch of claim 1, wherein the first-stage switch is reuseable.

3. The switch of claim 1, wherein the second-stage switch is a fuse element which is operative to burn open when conducting an electrical current in excess of a predetermined magnitude.

4. The switch of claim 1, wherein the second-stage switch is a low-inductance element operative to control damage to the first-stage contacts.

5. The switch of claim 1, wherein the first-stage switch comprises coaxial tubular stator and armature members and wherein the primary and secondary contacts provide electrical connections between the stator and armature members.

6. The switch of claim 1 in combination with a source of electrical current and an electrical load, wherein the source of electrical current is connected to the first-stage switch and the electrical load is connected in electrical parallel with the second-stage switch, the first-stage switch operative alternatively to electrically short-circuit the source of current and load and to switch the source of current into the second-stage switch.

7. A staged switch for interconnection between a source of electric current and an electrical load circuit, comprising:

a first stage having primary and secondary stator members, each stator member being generally tubular and the stator members being configured in a coaxial arrangement, primary and secondary armature members, each armature member being generally tubular and the armature members being configured in a coaxial arrangement, the armature members and stator members arranged in a coaxial configuration and the armature members being movable longitudinally relative to the stator members, and primary, secondary and return contacts, the primary contacts controllably connecting the primary stator member with the primary armature member and the secondary contacts controllably connecting the secondary stator member with the secondary armature member; and a second stage having an element for conducting an electrical current below a pre-selected magnitude and an exploding gap for parting when the electrical current exceeds the pre-selected magnitude, wherein the second stage is connected between the primary and secondary stator members and electrically connected in series with the secondary contacts, the second stage and the secondary contacts being electrically connected in parallel with the primary contacts, the secondary contacts operative to close before the primary contacts open, and the source of electrical current connected to the primary and secondary contacts and the load circuit connected to the second stage.

* * * * *